PRINTED CIRCUITRY

Filed June 19, 1968

INVENTOR
LAWRENCE R. TRAVIS

BY McLean, Morton & Boustead
ATTORNEYS 3,704,164
PRINTED CIRCUITRY
Lawrence R. Travis, Brockton, Mass., assignor to Electro Connective Systems, Inc., Brockton, Mass.
Filed June 19, 1968, Ser. No. 738,144
Int. Cl. B44d *1/18, 1/02*
U.S. Cl. 117—212 4 Claims

ABSTRACT OF THE DISCLOSURE

Apparatus for and a method of producing indefinite lengths of flexible flat circuitry, such as flexible flat cable having one or more electrical conductors forming circuit paths between two insulatory layers with openings in predetermined locations of one insulatory layer for attachment of terminals, etc. A sheet of insulatory material having flat electrical conductors on one of its surfaces is passed through one coating station at which a layer of insulatory material is applied to selected lengths of the circuitry. The sheet is also passed through another coating station at which insulatory material is applied to other lengths of the circuitry at which insulation is desired, leaving uncoated selected locations of the conductor to provide openings for attachment of connectors and other terminating and interconnecting devices.

This invention relates to the manufacture of flat flexible electrical circuitry. More particularly this invention relates to an apparatus for and method of manufacturing continuous rolls of indefinite length of flat flexible electrical circuitry having flat conductors forming circuit paths disposed between two layers of insulation with openings at preselected locations in one layer of insulation to permit attachment of electrical connectors, etc.

The lack of adequate and reliable termination techniques has been a primary deterrent to the widespread use of flat, flexible circuitry. An increasing number of applications for such circuits are being found in such areas as computers and space technology. The many advantages of flat flexible circuits are not limited to printed circuit board systems, however. By replacing complex harnesses of multiple wires with a single flexible flat cable, equivalent current carrying capacity is obtained in a fraction of the original space and weight. Flat flexible cables and harnesses can be rolled, folded and preformed to fit any packaging shape. Such cables and harnesses are vibration proof, and they substantially reduce wiring errors and simplify servicing. It will be understood that the present invention relates to flat flexible circuitry, whether in the form of circuit boards, harnesses or cables.

To attach connectors to flat flexible circuits, it has been the practice to remove insulation from one side of the circuit at the location at which it is desired to make a connection. This can be achieved for example, by cutting or by using an abrasive or heat to remove the insulation. Alternatively chemical means such as etching might be used to remove the insulation. Such subtractive techniques, however, do not always completely remove the insulation material, and so frequently a thin transparent film of insulation remains on the conductors. Alternatively, such a subtractive operation might go too deeply into the cable and as a result damage the conductor.

In one aspect the present invention is a process for producing indefinite lengths of flat, flexible, electrical circuits having coplanar, flat ribbon conductors, forming circuit paths between flexible insulatory sheets, with openings at preselected locations in one of the insulatory sheets to permit connection to one or more conductors. In the process of the present invention, a ribbon of insulatory material supporting a plurality of conductor paths is fed to a coating station which coats the conductors with a continuous coating of insulatory material. Surrounding those locations at which it is desired to leave openings for subsequent electrical connection to one or more conductors, the roller or other coating device is moved to a second position in which it does not contact the conductors or is otherwise inactivated. At a second station a roller is indexed into a position in which it contacts the electrical conductors at these uncoated areas. This roller can include depressions on its surface corresponding to the areas which are to be left uncoated. The roller at the second station thus coats those portions of the previously uncoated area which are to receive insulation and leaves uncoated the preselected locations at which connections are to be made. Alternatively, the roller might receive a patterned coating as in offset printing. Other means might be utilized to coat the preselected portions of uncoated areas in place of the roller. For example, a silk screening process or a spray through mask could be used to achieve selected coating. The order of coating can also be reversed, i.e., the patterned coating might be first applied.

Another aspect of the present invention is an apparatus for producing flat flexible circuits having openings in one insulatory layer for the attachment of connectors. This apparatus includes a first coating means for applying a continuous coating and a second coating means for applying a coating having selected areas left uncoated.

A further aspect of the present invention is flat flexible circuitry including flat conductors forming circuit paths disposed between a pair of insulatory layers having openings in one of the insulatory layers for making connection to one or more of the conductors which circuitry is produced by the process of the present invention.

These and other aspects and advantages of the present invention are apparent in the following detailed description and claims, particularly when read in conjunction with the accompanying drawings in which like parts bear like reference numerals. In the drawings:

Figures 1, 2, 3, 4:
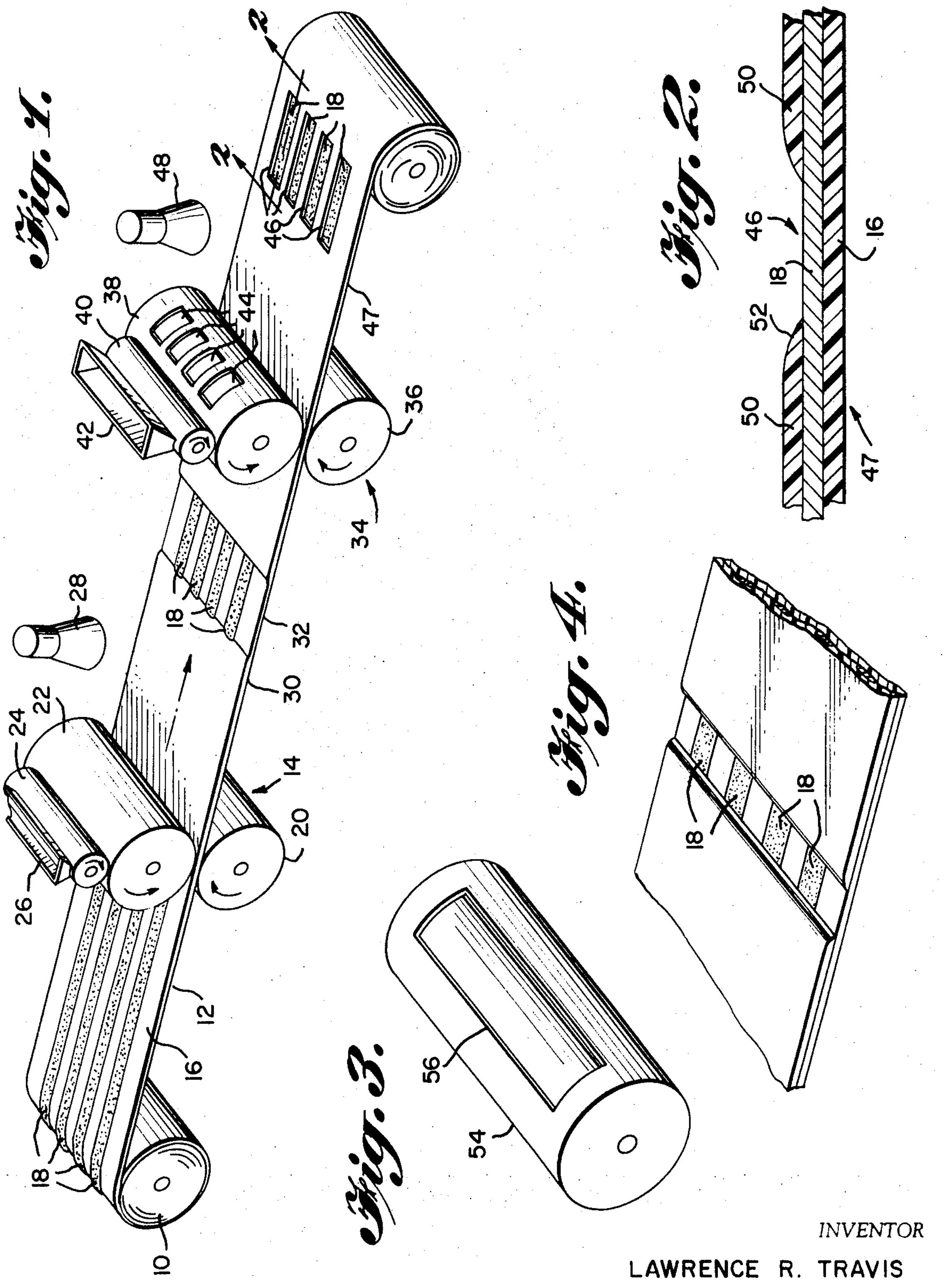
FIG. 1 is a diagrammatic representation of the apparatus of the present invention utilized to produce flat flexible cable by the process of the present invention.
FIG. 2 is a view taken along line 2—2 of FIG. 1.
FIG. 3 is a diagrammatic representation of a second embodiment of a roller usable for coating selected areas of electrical cable.
FIG. 4 is a diagrammatic representation of flat flexible cable which has been coated by means of the roller depicted in FIG. 3.

As shown in FIG. 1, a roll 10 of insulatory backed ribbon conductors supplies a sheet 12 to a first coating station 14. Sheet 12 includes an insulatory backed material 16 upon the upper surface of which are bonded a plurality of conductive ribbons 18. By way of example, insulatory layer 16 can be a polyamide-polyimide, while conductors 18 can be any electrically conductive material such as aluminum, zinc, magnesium or copper. Although four conductive ribbons 18 are depicted in FIG. 1, any number can be provided. The sheet 12 can be produced in any of several well known manners. By way of example, U.S. patent application Ser. No. 649,877, filed June 29, 1967 by Lawrence R. Travis and entitled "Method of Producing Printed Circuits" discloses a suitable method for producing sheet 12.

Coating station 14 includes a backing roller 20 beneath sheet 12 and an application roller 22 above sheet 12. A supply roller 24 contacts the surface of application roller 22 and distributes a liquid insulatory material from supply source 26 onto the surface of application roller 22. Application roller 22 is moved into a position in which it contacts the sheet 12 in those locations of sheet 12 on which it is desired to apply a continuous insulatory layer above conductors 18. The liquid applied by roller 22 might be an insulatory resin either in the form of a hot melt or in solution with solvent. This liquid then solidifies either upon cooling or upon evaporation of the solvent. If evaporation of the solvent is relied upon for solidification, then means such as heat lamp 28 can be utilized to aid evaporation.

Surrounding those locations of sheet 12 on which it is desired to have no upper insulatory layer, application roller 22 is moved to a second position in which it is not in contact with sheet 12. To conserve the liquid insulatory material in supply source 26, the supply source can be closed by suitable means (not shown), and supply roller 24 and application roller 22 can be kept stationary until the next location of sheet 12 on which insulation is desired is beneath application roller 22.

Because the surface area of application roller 22 which is in contact with sheet 12, when roller 22 is in its contacting position, is fairly large, movement of application roller 22 to its second position, out of contact with sheet 12, results in an uncoated section of substantial length on sheet 12. The flat cable which has passed through coating station 14 thus includes a section 30 having an upper insulatory layer which has been applied by application roller 22 and a second section 32 upon which there is no upper insulatory layer since application roller 22 was in its position out of contact with sheet 12 during the time section 32 passed coating station 14. This cable is then passed to a second coating station 34 which includes support roller 36 beneath sheet 12 and application roller 38 above sheet 12. Application roller 38 is provided with a supply roller 40 which applies a liquid insulatory material to the surface of application roller 38 from supply source 42.

Application roller 38 includes in its surface depressions 44 positioned in accordance with the location of conductive ribbons 18 on sheet 12. When section 30 of sheet 12, having an upper insulatory layer on it, is passed through second coating station 14, application roller 38 is in a position in which it does not contact sheet 12. When section 32 of sheet 12, which does not have an upper insulatory layer, reaches second coating station 34, application roller 38 is indexed to a position in contact with sheet 12 so that, as application roller 38 rotates, insulation is applied to sheet 12. However, in the area of depressions 44, the surface of sheet 12 does not contact application roller 38. Thus, no insulatory material is applied to sheet 12 in those locations. Since depressions 44 are positioned to correspond with conductors 18, the uncoated areas 46 on the upper surface of the resulting cable 47 provide access to conductors 18 for subsequent external connection. Again, if desired, a source of heat such as heat lamp 48 can be provided immediately after second coating station 34 to speed the solidification of the upper insulatory layer.

The flat flexible cable 47 produced in accordance with the present invention provides openings 46 at selected locations for the attachment of connectors. Since these openings are formed by omitting the application of insulation rather than by removing insulation which has been applied, a much improved flat flexible cable is provided. FIG. 2 depicts in detail the opening 46 to which connectors are to be attached. The lower insulatory layer 16 has upon its upper surface the ribbon conductors 18. Upper insulatory layer 50 is provided with an opening 46 through which conductor 18 is accessible. Since opening 46 is provided by the omission of the insulatory material of upper layer 50, rather than by the removal of insulatory material, the upper insulatory layer 50 adheres to the conductor 18 up to the edge of opening 46. In contrast to this, flat flexible cable having openings in its insulation which are formed by removal of insulation frequently has small areas immediately surrounding such openings at which the insulation is not rigidly adhered to the conductors. As a consequence, in such cables the insulation can pull away from the conductors at locations in which it is desired to have insulation. This, of course, weakens the insulation. Such cable also frequently has scratches or cuts in the upper surface of conductor 18, caused by too deep a penetration of the insulation removal apparatus. Alternatively, such a cable might have a thin transparent layer of insulation left above the ribbon conductors 18. The cable produced in accordance with the present invention, as depicted in FIG. 2 suffers from none of these defects. In addition, if desired, the depressions 44 in the surface of application roller 38 can be designed so that the upper insulatory layer 50 terminates in a smooth curve 52 adjacent opening 50, thereby leaving no sharp edge which might catch on something, tending to pull the insulation away from ribbon conductor 18.

FIG. 3 depicts another embodiment of an application roller suitable for use at second coating station 34. Roller 54 includes a single depression 56, extending substantially across the width of roller 54. Such an application roller results in the cable having a single opening across its width through which each ribbon conductor 18 is accessible, as depicted in FIG. 4.

Since it is desirable to provide long indefinite lengths of flat flexible cable having imperforate insulation, such as section 30 of sheet 12, it is desirable that the upper insulatory layer be applied at the first coating station by means which is capable of applying such an indefinite length, for example by an application roller. If the section 32 to which insulation is to be applied only in preselected locations at the second coating station is of significant length, then a single application roller might be impractical to cover such a length. In such a case, the second coating station can include two or more application rollers, as desired. Alternatively, the insulation can be applied to the second coating station by means such as silk screening which does not necessitate the use of an application roller.

Movement of application rollers 22 and 38 into and out of contact with sheet 12 can be controlled in any of several manners, including manually. By way of example, U.S. patent application Ser. No. 651,899, filed July 7, 1967, now abandoned, by Lawrence A. Travis discloses one method and means suitable for automatically controlling the movement of rollers 22 and 38.

It will be understood that although specific reference has been made to flat cable having parallel conductors, any conventional conductor configuration can be used and the particular circuit configurations are not part of this invention.

What is claimed is:

1. A process of continuously producing indefinite lengths of flexible flat circuits having insulatory layers with openings in predetermined locations of one of the insulatory layers comprising:

(a) passing a sheet of insulatory material having a flat electrical conductor on one surface through a first coating station and a second coating station;

(b) applying a layer of insulatory material to said electrical conductor and said one surface of said sheet at said first coating station over a predetermined first portion of said sheet;

(c) leaving a second portion of said sheet uncoated by said insulatory layer; and (d) applying a layer of insulatory material at said second station on said electrical conductor and said one surface of said sheet over said second portion leaving said conductor uncoated in selected areas.

2. The process of claim 1 further comprising heating the layer of insulatory material within said first portion after step (b) and heating the layer of insulatory material within said second portion after step (d).

3. The process of claim 1 in which said sheet has on its said one surface a plurality of electrical conductors.

4. The product formed by the process of claim 1.

References Cited

UNITED STATES PATENTS

| | | | |
|---|---|---|---|
| 3,205,094 | 9/1965 | Erlandson | 117—212 |
| 3,331,718 | 7/1967 | Ruffing | 117—8.5 X |

ALFRED L. LEAVITT, Primary Examiner

E. G. WHITBY, Assistant Examiner

U.S. Cl. X.R.

117—38, 43, 111, 119.6, 121, 161, 222; 156—48; 174—117

0-1050
(5/69)

UNITED STATES PATENT OFFICE
CERTIFICATE OF CORRECTION

Patent No. 3,704,164 Dated February 6, 1973

Inventor(s) LAWRENCE R. TRAVIS

It is certified that error appears in the above-identified patent and that said Letters Patent are hereby corrected as shown below:

The Patentee hereby disclaims all that portion of the term of the Letters Patent of the United States which extends beyond February 9, 1988, and agrees that such Letters Patent shall expire immediately if it ceases to be commonly owned with Letters Patent of the United States No. 3,562,037 granted to LAWRENCE R. TRAVIS on the 9th day of February, 1971, for CONTINUOUS METHOD OF PRODUCING INDEFINITE LENGTHS OF FLEXIBLE FLAT ELECTRICAL CONDUCTORS.

Signed and sealed this 18th day of December 1973.

(SEAL)
Attest:

EDWARD M.FLETCHER,JR.
Attesting Officer

RENE D. TEGTMEYER
Acting Commissioner of Patents

AMP 2884